Oct. 31, 1933.                G. LUTZ                1,932,416
APPARATUS FOR MAKING RECEPTACLES
Filed Jan. 16, 1931        4 Sheets-Sheet 1
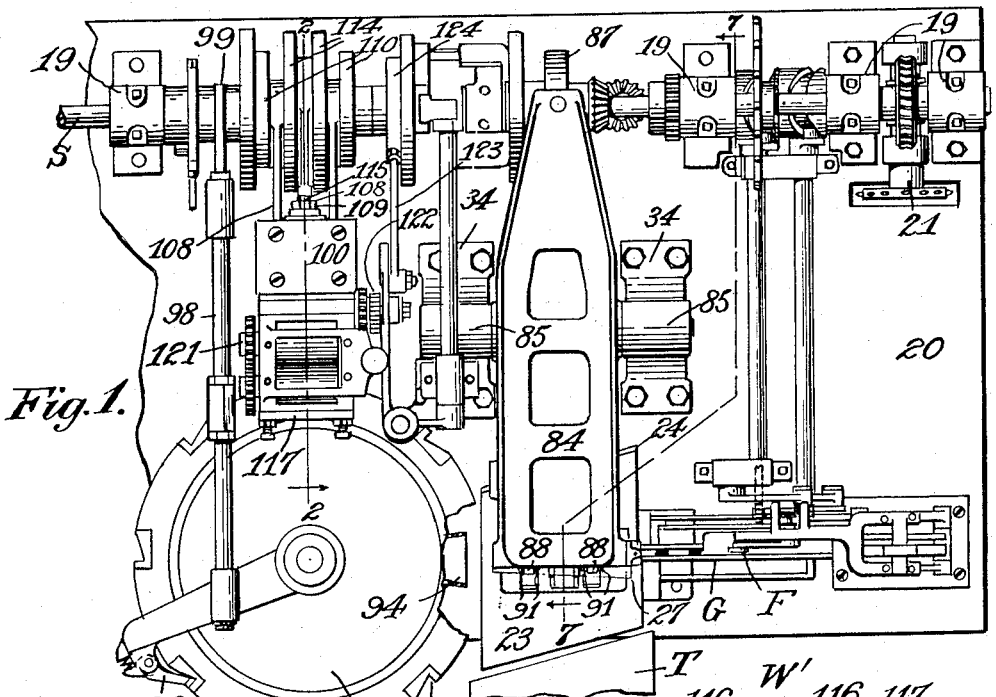
Fig. 1.
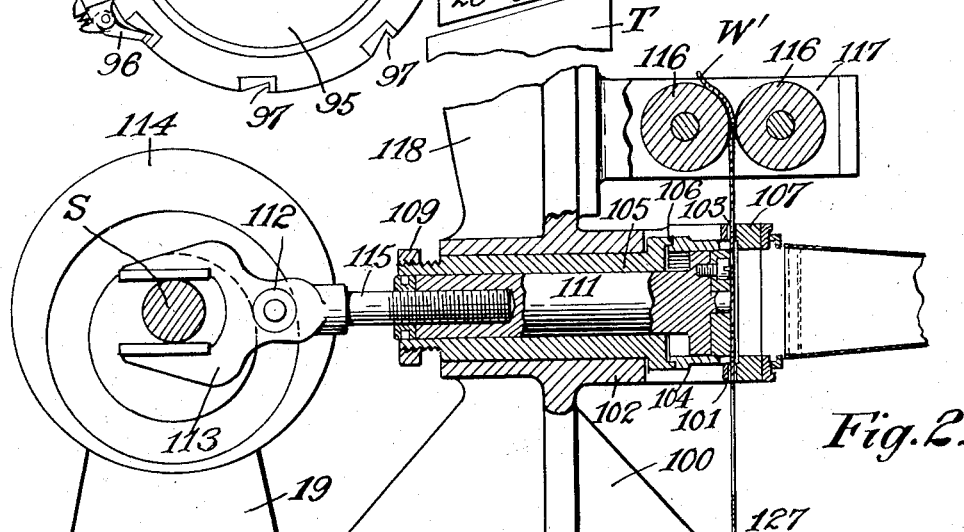
Fig. 2.
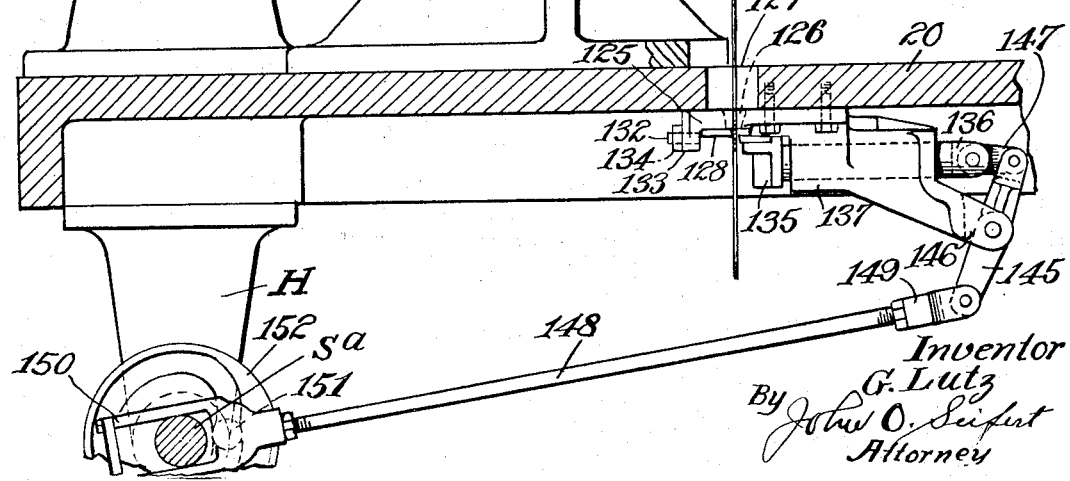
Inventor
G. Lutz
By John O. Seifert
Attorney

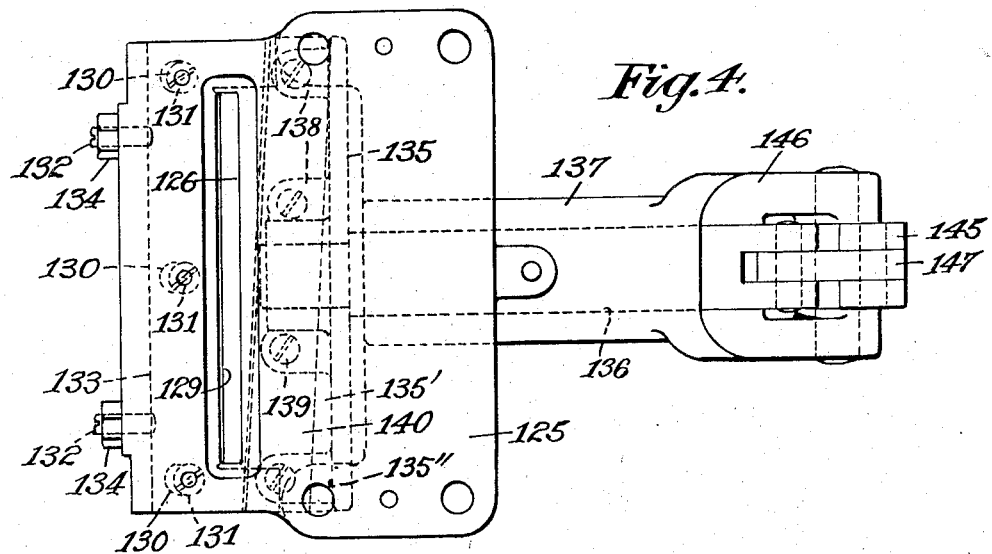

Oct. 31, 1933.                G. LUTZ                1,932,416
APPARATUS FOR MAKING RECEPTACLES
Filed Jan. 16, 1931        4 Sheets-Sheet 3
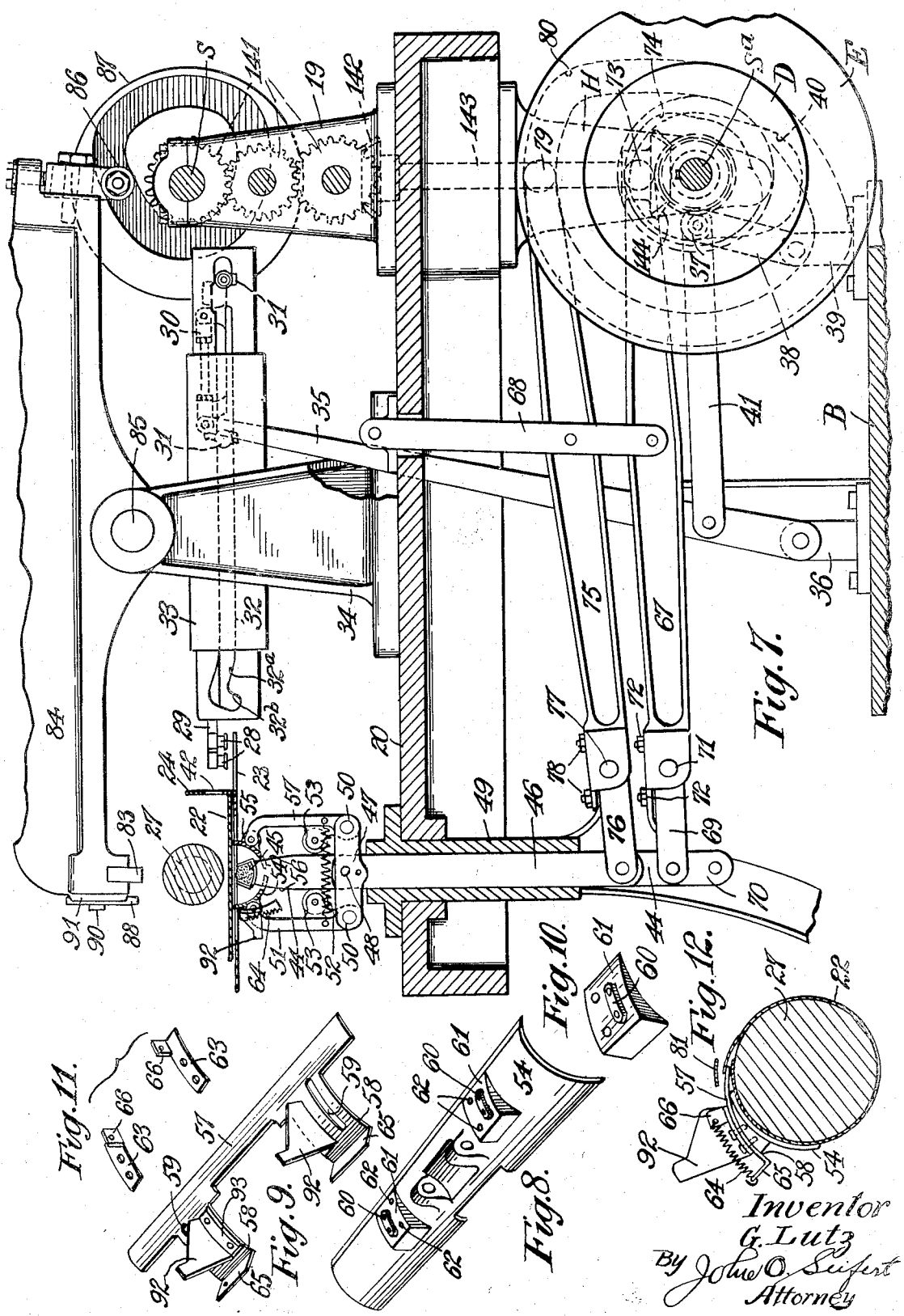
Inventor
G. Lutz
By John O. Seifert
Attorney Oct. 31, 1933.   G. LUTZ   1,932,416
APPARATUS FOR MAKING RECEPTACLES
Filed Jan. 16, 1931   4 Sheets-Sheet 4
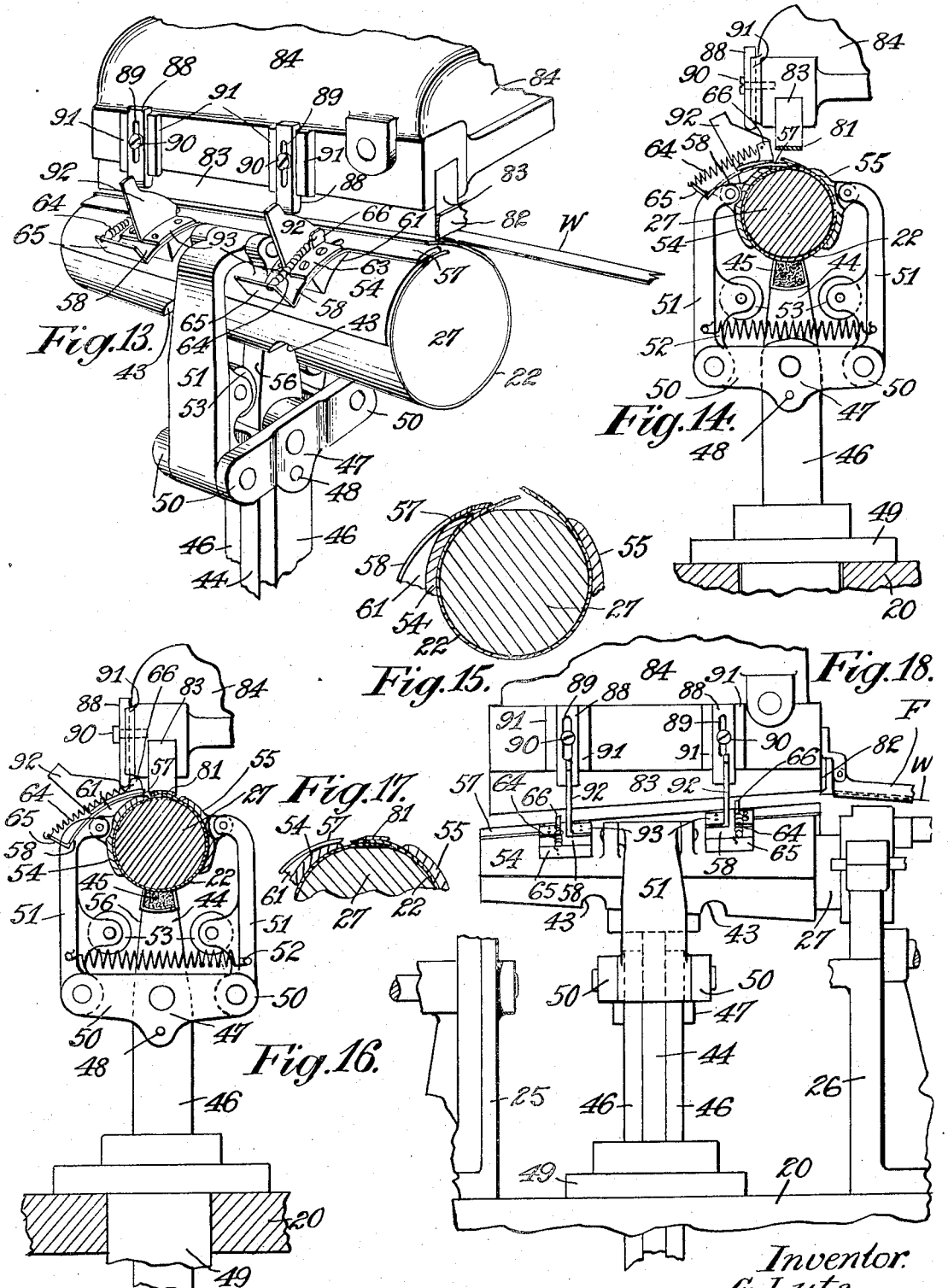

Patented Oct. 31, 1933

1,932,416

UNITED STATES PATENT OFFICE 1,932,416

APPARATUS FOR MAKING RECEPTACLES

George Lutz, Brooklyn, N. Y., assignor, by mesne assignments, to American Sealcone Corporation, New York, N. Y., a corporation of New York Application January 16, 1931. Serial No. 509,133

7 Claims. (Cl. 93—39)

This invention relates to apparatus for making receptacle or container bodies, forming a truncated conical receptacle body with a longitudinal overlapped seam, and for forming a head or closure for the end of the receptacle body and secure the same therein to form a receptacle or container, the apparatus being of the type disclosed by Letters Patent No. 1,628,074 issued May 10, 1927, wherein a sheet or blank of paper is wrapped around a mandrel and secured while on the mandrel at the longitudinal marginal portions by applying an adhesive strip or web thereto to form the receptacle body, which body is ejected from the mandrel and delivered to one of a series of holders equi-distantly spaced about a carrier intermittently operative to successively present the holders with receptacle bodies therein to means to stamp a disk from a web, peripherally flange the disk and engage the flanged disk in the end of a receptacle body in a holder to serve as a bottom closure therefor. The carrier is then rotated to advance the holder with the receptacle body having the flanged disk engaged therein to means to secure the flanged disk in the receptacle body by upsetting or rolling together the disk flange and contiguous portion of the receptacle body, when the carrier is further rotated to advance the holder with the receptacle to position to eject the receptacle from the holder.

It is an object of the invention to provide improved means to tuck one longitudinal marginal portion of the receptacle blank under the other marginal portion during the wrapping of the blank around the mandrel to position said marginal portions in overlapped relation preparatory to the applying of an adhesive securing strip or web thereto, said means being more efficient and positive in operation and comprising a less number of parts than in the apparatus as shown in application Serial No. 301,010 filed August 21, 1928, thereby reducing the cost of manufacture.

Another object of the invention is to provide means to sever the waste portion of the web from which the flanged disks have been stamped and engaged in the ends of receptacle bodies to serve as bottom closures for the receptacles, whereby the feeding of the web to the disk stamping means will not be interfered with by the buckling of the web due to an accumulation of the waste portion thereof below said disk stamping means, and also prevent the waste portion of the web from becoming entangled with the operative mechanism and possible breakage thereof.

Other objects and advantages will hereinafter appear.

In the drawings accompanying and forming a part of this application, Figure 1 is a view looking at the top of a portion of the apparatus for making receptacle bodies and showing the related parts of the embodiments of the invention of this application.

Figure 2 is a cross sectional view of means to stamp a closure disk from a web and position the same in a receptacle and showing means to sever the waste portion of the stamped web, taken on the line 2—2 of Figure 1 looking in the direction of the arrow.

Figure 3 is a side elevation of the web severing means shown in Figure 2.

Figure 4 is a view of the severing means looking at the top of Figure 3.

Figure 5 is a partial view of the severing means looking at the bottom of Figure 3.

Figure 6 is a perspective view of the cutters of the severing means shown in Figures 3 to 5, inclusive, and showing in dot and dash lines a waste portion of the web positioned relative to said members.

Figure 7 is a cross sectional view taken on the line 7—7 of Figure 1 looking in the direction of the arrows, of means to position a receptacle blank relative to and wrap the same around a mandrel and showing my improved means for tucking one longitudinal marginal portion of the blank under the other marginal portion.

Figure 8 is a perspective view of a flap of the means to wrap the receptacle blank around the mandrel.

Figure 9 is a perspective view of the means to tuck one longitudinal marginal portion of the blank under the other marginal portion and showing the same relative to the flap shown in Figure 8 on which it is mounted.

Figure 10 is a perspective view of one of a pair of blocks carried by the flap for mounting the tucking-in means on the flap.

Figure 11 is a perspective view of a pair of clamping members to retain the tucking-in means shown in Figure 9 to the mounting blocks, and showing the same relative to said tucking-in means.

Figure 12 is a cross sectional view of the mandrel showing one longitudinal marginal portion being tucked under the other marginal portion of a receptacle blank as it is wrapped around the mandrel with an adhesive strip in position prior to the application thereof to the overlapped marginal portions of the blank.

Figure 13 is a perspective view showing a receptacle blank wrapped around the mandrel and a ram engaging the tucking-in means to actuate the same away from the marginal portions of the blank prior to the ram engaging and applying an adhesive strip positioned relative to said portions of the blank.

Figure 14 is an end elevation, partly in cross section, looking at the right of Figure 13.

Figure 15 is a cross sectional view showing the wrapping of a receptacle blank about the mandrel prior to the tucking-in of a longitudinal marginal portion of the blank, as shown in Figure 12.

Figure 16 is a view similar to Figure 14 showing the mandrel applying an adhesive strip to the lapped marginal portions of the receptacle blank with the tucking-in means actuated away from the strip.

Figure 17 is an enlarged fragmentary view showing the positions of the wrapping and tucking-in means shown in Figure 16; and Figure 18 is a side elevation looking at the left of Figure 13 and showing the supporting structure for the mandrel.

In the embodiment of the invention illustrated in the drawings and operative mechanism of the apparatus is mounted upon a supporting base B (Figure 7), and said mechanism is actuated from a drive shaft S journaled in standards 19 on a table 20 superposed to the supporting base B, said shaft being driven from a suitable source of power (not shown) through a power shaft and worm gearing, as shown at 21 in Figure 1.

Blanks or sheets 22 from which the receptacle bodies are formed are fed or delivered from a pile of sheets on a suitable support T, partly shown in Figure 1, to a table 23, with one longitudinal edge of the delivered blank in register with a gauge 24 fixed to the table 23, as shown in Figure 7. The table 23 is arranged with an opening centrally thereof and supported from the table 20 by standards 25 and 26, as shown in Figure 18, to extend in a horizontal plane below a mandrel or horn 27 of truncated conical form and around which mandrel the blank is wrapped in forming the receptacle body.

The blanks are fed to the table 23 by suction means (Figure 7) embodying suction cups 28 carried at the ends of tubes 29 connected at the opposite ends with vacuum creating means (not shown) and supported by a carriage 30 having rollers 31 engaged in cam slots 32 of a pair of parallel and spaced plates fixed to brackets 33 mounted upon opposed standards 34 supported upon the table 20. The carriage and suction cups are reciprocated by an arm 35 pivotally supported at one end by a bracket 36 fixed upon the base B, and extending upward therefrom through the table 20 and between the tubes 29 and pivotally connected at the upper end to the forward end of the carriage 30. The arm 35 is oscillated to reciprocate the carriage by a roller 37 carried by an arm 38 pivotally supported by a bracket 39 fixed upon the base B, and the roller 37 engaging a cam groove 40 in the face of a disk D fixed to a shaft Sa, the arms 35 and 38 being operatively connected by a link 41. During the reciprocatory movement of the suction cup carrying tubes they pass through openings 42 in the gauge 24 and recesses 43 extended transversely through the bottom of the mandrel, and as the carriage rollers 31 approach the terminus of their forward movement in the slots 32 they ride up inclined portions 32a in said slots thereby lifting the suction cup carrying ends of the tubes for engagement upon the top of the supply pile of blanks on the support T, and at the termination of such movement the carriage rollers ride down declining portions 32b of the slots 32. During the initial portion of the return movement of the suction tube carrying carriage 30 the carriage rollers 31 ride up the declining portions 32b lifting the cups with the top sheet from the sheet pile, and as the carriage rides down the incline portions 32a the blank is positioned on the table 23 in register with the gauge 24 whereby the blank is stripped from the suction cups, this retrograde movement of the carriage continuing until the suction cups are positioned in the rear of the gauge 24, as shown in Figure 7.

After the positioning of the blank 22 on the table 23 and during the interim of movement of the suction cup carrying tubes, a plunger 44 is moved upward through the tables 20, 23 to engage a pad 45 of suitable material, such as sponge rubber or the like, carried by the plunger with the blank intermediate the longitudinal marginal portions and lifting the blank from the table 23 and clamping it to the mandrel, and simultaneously therewith a pair of plungers 46 are brought into operation, said plungers being juxtaposed to the opposite sides of the plunger 44 to have longitudinal sliding movement toward and away from the mandrel with the upper ends terminating at a point below the upper end of the plunger 44. The upper ends of the plungers 46 are extended into a rectangular opening in a head 47, and the head mounted on said plunger by studs 48 with the plunger 44 slidably interposed between the plungers 46 and extended beyond the head 47. The head is held against rotative movement on the studs 48 by pins 48' engaged in alined perforations in the head and plungers. The plungers 46 are slidably mounted in a guide member 49 extended through an opening in and supported from the table 20 by a flange of the guide member overhanging the wall of the opening. The head 47 has a pair of ears 50 extended from the opposite sides and between which ears a pair of arms 51 are pivotally supported to extend upwardly and are urged in a direction toward each other by a spring 52 attached at the ends to the arms to engage rollers 53 carried by the arms with the plunger 44 in the normal position of the plungers and during the initial movement of the arm carrying plungers 46. Flaps 54, 55 are pivotally carried at the upper free ends of the arms 51, said flaps being of arcuate or curved form in cross section to conform with the contour of the mandrel. As the flap carrying arms 51 are moved upwardly by the plungers 46 the leading longitudinal edge of the flaps engage the blank 22 at opposite sides of the mandrel, and as the upward movement of the plungers is continued and as the flaps are brought into engagement with the blank on the mandrel the rollers 53 will ride off the plunger 44 due to the converging of the opposite edge portions of said plunger to the extremity thereof, as shown at 56, and the flaps urged into engagement with the blank 22 on the mandrel by the spring 52 wrapping the blank under tension and in taut condition around the mandrel.

The width of the receptacle blank 22 is such that when it is wrapped around the mandrel one longitudinal marginal portion may be lapped over the other marginal portion, as shown in Figure 17. To facilitate the overlapping of the marginal portions the flap 54 is arranged with guiding means, herein termed "tucking-in" means, adapted to engage the marginal portion of the receptacle blank intermediate the edge of the blank and flap 54 during the wrapping movement of the flaps. Said means comprises a plate 57 having a longitudinal straight edge and lateral extensions 58 projecting in a direction opposite to the straight edge and of curved form in cross section (Figure 9). The extensions 58 are arranged with slots 59 engaged on bosses 60 extended from blocks 61 fixed to the flap 54 on opposite sides of the arm 51 by rivets or screws, as at 62, the slots 59 being of greater length than the bosses 60 to permit sliding movement of the plate 57 relative to the flap 54. To effect the tucking in of the marginal portions of the receptacle blank the plate 57 is adapted to extend in an arc intersecting the arc of the curvature of the flap 54 by arranging the upper free surface of the blocks to extend in an arc greater than the curvature of the flap by tapering the blocks toward the leading longitudinal edge of the flap, as shown in Figures 8 and 10. The plate is slidably retained on the bosses 60 by cap members or strips 63 engaged over the slots 59 and retained against the extensions 58 by screws passed through perforations in cap members and the slots 59 and threaded into the bosses 60, the cap members being retained to such a degree to permit sliding movement of the plate on the blocks 61. The straight edge of the plate is normally positioned to extend beyond the leading longitudinal edge of the flap 54 by springs 64 attached at the ends to lip portions 65 formed by bending at right angles the free end portions of the extensions 58 and to ears 66 projected from the cap members 63 so that the ends of the slots 59 adjacent the lip portions 65 will abut against the bosses 60 whereby the straight edge of the plate will extend a predetermined distance from the flap to assure the directing of the marginal longitudinal portion of the receptacle blank engaged by the plate 57 below the other marginal portion of the blank, as shown in Figure 12, when the flaps are in full blank wrapping position.

The blank clamping plunger 44 is actuated by a lever 67 pivotally mounted on an arm 68 pivotally suspended from the table 20, and having a pivotal and adjustable connection at one end with the plunger 44 through a connector 69 having a bifurcation at one end to straddle the end of the plunger 44 extended below the plungers 46 and the legs of the bifurcation pivotally connected with the plunger 44 through links 70, as shown in Figure 7. The opposite end of the connector 69 is extended into and pivotally supported in a hood portion of the lever 67, as shown at 71 in Figure 7, and adapted to be adjusted in angular relations to the lever to compensate for variations desired in the movement of the plunger 44 by adjustable abutments in the form of set screws 72 threaded into the hood portion of the lever 67 and engaging with the connector 69 at opposite sides of its pivotal connection with the lever 67. The lever 67 is actuated by a roller 73 carried at the free end of said lever engaging a cam groove 74 in the face of a disk E fixed on the shaft $Sa$.

The plungers 46 are actuated by a lever 75 pivotally supported intermediate the ends by the arm 68 above the lever 67 and is operatively connected at one end with the plungers 46 through a connector 76 similar to the connector 69, the one end of said connector being bifurcated and the legs thereof straddling the plungers 46 and pivotally connected therewith, and the opposite end of said connector being extended into and pivotally supported in a hood portion of the lever 75, as shown at 77 in Figure 7, and adapted to be adjusted in angular relations to the lever 75 to compensate for variations desired in the movement of the plungers 46 by set-screws 78 threaded into the hood portion of the lever and engaged with the connector 76 at opposite sides of its pivotal connection with the lever 75. The lever 75 is actuated by a roller 79 carried at the free end of said lever engaging a cam groove 80 in the face of disk E encircling the cam groove 74 in said disk, thereby imparting movement to the plungers 46 timed to the movement of the plunger 44, but of greater travel.

The overlapped marginal portions of the blank wrapped around the mandrel are secured together to form a receptacle body by applying a predetermined length of an adhesive strip 81 fed from a roll of web W by suitable means, designated in a general way at F in Figure 1, but as such means does not constitute a part of the invention of this application detail illustration and description is not deemed necessary. The strip 81 is severed into predetermined lengths, substantially equal to the length of the receptacle blank, by a cutter 82 carried by an anvil 83 of a ram 84 pivotally mounted between the standards 34, as at 85 in Figure 7, in superposed relation to the blank feeding means 29, with one end supported by a roller 86 adjustably carried by the ram and engaging a cam groove in a disk 87 fixed to the drive shaft S, whereby through the rotation of the disk 87 the anvil end of the ram is actuated toward the mandrel to sever a predetermined length of sealing strip 81 fed relative to the anvil 83 and apply the strip 81 with the adhesive surface lowermost to the overlapped marginal portions of the blank wrapped around the mandrel. The anvil 83 extends in an oblique direction relative to the ram and parallel to the mandrel which is conical, to apply an even pressure along the entire length of the strip.

To permit the application of the sealing strip 81 to the overlapped marginal portions of the receptacle blank wrapped around the mandrel the tucking-in plate 57 is actuated in a direction away from the marginal portions of the blank independent of the movement of the flaps, and while the flaps are maintained in full actuated blank wrapping position during the feeding and applying of the sealing strip to the lapped marginal blank portions. The plate 57 is actuated to such position by the movement of the ram toward the mandrel by abutment members 88 having slots 89 engaged by set-screws 90 threaded into the ram so that upon the loosening of the set-screws the members 88 may be vertically adjusted in slideways formed by parallel pairs of ribs 91 on the ram, as shown in Figures 13, 14 and 18, to compensate for different size mandrels. The abutments 88 as the ram approaches the mandrel engage obliquely extending edges of ears of members 92 having angular portions whereby they are fixed to the tucking-in plate extensions 58, as at 93 in Figure 9, with the ears extending in parallel relation to the slots 59, the oblique edges being extended at such an angle to transmit the downward movement of the ram to arcuate movement of the tucking-in plate 57 on the blocks 61. In the sealing strip applying position of the ram the abutments 88 are engaged with a straight edge of the ears intermediate the junction of the ears 92 and the plate 57 and the inclined edge of the ears, as shown in Figure 16, and as the ram moves away from the mandrel the plate is returned to its normal position by the springs 64.

Upon the sealing of the strip to the marginal portions of the receptacle blank and during the moving of the ram away from the mandrel the plungers 44 and 46 are moved away from the mandrel to position, as shown in Figure 7, until another blank is positioned on the table 23 in register with the gauge 24 when the foregoing described operation is repeated.

During the movements of the ram and plunger 44 and 46 away from the mandrel the formed receptacle body on the mandrel is ejected from the mandrel by suitable means, designated in a general way at G in Figure 1, and comprising reciprocatory ejector members, but as such means does not constitute a part of the invention of this application detail illustration and description of the structure and operation thereof is not deemed necessary. The ejected receptacle body is positioned by the ejecting means in one of a series of holder members 94 equidistantly spaced about and carried by a disk 95 rotatably mounted on the table 20 and intermittently actuated by a pawl 96 releasably engaging equidistantly spaced notches 97 arranged in the peripheral portion of the disk, the pawl being intermittently reciprocated by a rod 98 actuated by a cam disk 99 fixed on the drive shaft S, as shown in Figure 1.

The formed receptacle body in the holder 94 is intermittently advanced from the mandrel and positioned relative to means to stamp a bottom closure disk from a web W', peripherally flange the stamped disk and engage the same in one end of the receptacle body in a holder positioned relative thereto, said means comprising punch and die mechanism carried by a standard 100 supported on the table 20. The punch and die mechanism embodies a plate 101 having an opening therethrough and fixed in axial relation to the end of a tubular member 102 of said standard 100 and having a recess 103 in the outer face to provide a space for the feeding of the web across said plate relative to the opening therein. A tubular punch head 104 is actuated relative to the opening in the plate 101 by a tubular plunger 105 slidably mounted in the tubular member 102 and connected to the punch head through an angular joint, as at 106 in Figure 2, arranged in a bifurcated portion at the end of the tubular member 102, whereby the plunger and punch are held against rotative movement. A die block 107 having an opening therethrough with two diameters is fixed to the plate 101 with the opening portion of greatest diameter adjacent to said plate. To reciprocate the plunger 105 to stamp a disk from the web a pair of arms 108 (Figure 1) are connected at one end to the opposite sides of the plunger and are adjusted relative to said plunger by a collar 109 threaded onto the end of the plunger and engaged in opposed recesses in the arms 108 with the opposite ends of the arms 108 connected to disk cams 110 fixed on the drive shaft S to impart reciprocatory movement to the plunger 105. As the disk is stamped from the web it is successively and peripherally flanged by the head of a plunger 111 forcing the disk through the reduced portion of the opening in the die block 107. The plunger 111 is slidably mounted in the tubular plunger 105 and reciprocated by rollers 112 mounted on a yoke member 113 and engaged in cam grooves in disks 114 fixed on the drive shaft S, and the yoke having an adjustable connection 115 with the plunger 111. Simultaneously with the flanging of the closure disk it is inserted into the end of the receptacle body in a holder stationed relative to the punch and die mechanism, the movement of the plunger 111 being of an extent and the disk flange of a length so that the end of the receptacle body will project beyond the disk flange and during the insertion of the closure disk into the receptacle end, the latter is formed with a shoulder against which the flanged disk is seated.

The web W' is fed intermittently to and in timed sequence with the operation of the punch and die mechanism by a pair of rollers 116 rotatably mounted in a frame 117 fixed to an extension 118 of standard 100 above the punch and die mechanism. The rollers are positively driven by meshing gears 121 (Figure 1) fixed to the shafts of the rollers 116 and intermittently rotated by pawl and ratchet mechanism 122 actuated by an oscillating arm 123 driven from the drive shaft S by a strap carried by the arm encircling an eccentric disk fixed on the shaft, as at 124 in Figure 1.

The web W' is fed by the feeding rollers 116 from a roll (not shown) supported on the standard extension 118 above the feeding rollers, the rollers being actuated to feed successive predetermined lengths of web to and from the punch and die mechanism. The waste portion of the web from which bottom disks have been stamped upon the successive operation of the punch and die mechanism and the web feeding rollers accumulates below the punch and die mechanism, as shown in Figure 2, not only causing buckling of such waste portion and retarding the feeding of a predetermined length of web to the punch and die mechanism, but becomes entangled with the operative parts with possible breakage thereof. To overcome this the waste portion of the web is severed at a predetermined distance from the punch and die mechanism by severing means comprising a bracket 125 fixed to the underside of the table 20 and having an elongated opening 126 in alinement with an opening 127 in the table and the web guiding recess 103 of the punch and die mechanism. The longitudinal walls of the bracket opening 126 converge toward each other in a direction downward from the table 20. A cutter blade 128 is mounted on the bracket 125 with the cutting edge 129 extending parallel to an edge of the narrow portion of the opening 126 to constitute a continuation of the outer longitudinal wall of the opening, as shown in dotted lines in Figure 3. The cutting edge 129 is arranged on the cutter blade intermediate end portions 128' of the blade extended beyond the cutting edge, the blade having a series of elongated perforations 130 for the engagement of headed screws 131 threaded into the bracket 125 to secure the cutter blade to the bracket with the extended end portions 128' parallel with the ends of the opening 126, as shown in Figure 5. The cutter 128 is adjustable relative to the opening 126 by adjustable abutments in the form of set-screws 132 threaded in and extended through a flange 133 extending from the bracket 125 to abut the back edge of the cutter blade, as shown in Figures 3 and 5, the screws 132 being retained in adjusted position by lock nuts 134. During the feeding of the web to the punch and die mechanism the waste portion of the web is positioned relative to the cutting edge 129 of cutter 128, as shown in Figures 2 and 6, and said portion is severed by a shearing cut of a cutter 140 movable relative to and co-operating with the cutter 128, said cutter being mounted on a shelf portion 135' of a carrier bracket 135 mounted on the projecting end of a rod 136 slidably mounted in a tubular portion 137 of the bracket 125, as shown in Figure 3, the bracket 125 being arranged so that the cutter 140 will travel in a plane below and contiguous to the fixed cutter 128. The free longitudinal edge of the shelf portion 135' is extended at an angle to the cutting edge 129 and has a series of openings extending in a line parallel with said inclined edge and terminating in threaded portions in bosses 138 on the underside of the shelf, said openings being for the engagement of head screws 139 extended through and countersunk in the openings in the cutter blade 140 to secure said cutter blade to the shelf 135' with the cutting edge thereof extending parallel to the inclined edge of the shelf and inclined to the cutting edge 129, the blade 140 being of a length to slidably engage the end portions 128' of the cutter 128. As the cutter carrying bracket 135 moves toward the fixed cutter 128 the cutting edge of the cutter 140 will move progressively relative to the cutting edge of the fixed cutter whereby a shearing cut of the web is effected by the fixed and movable cutters. Reciprocatory movement is imparted to the cutter carrying bracket 135 in synchronism with the reciprocatory movement of the punch head 104 relative to the die block 107 from the shaft Sa journalled in hangers H suspended from the table 20 and driven from drive shaft S through a train of gears 141 connected to the drive shaft and including a bevel pinion 142 fixed to a vertical shaft 143 rotatably carried by the table 20 and connected to the shaft Sa through bevel gearing 144, as shown in Figure 7. The cutter bracket 135 is operatively connected to the shaft Sa by a lever 145 pivotally mounted in a bifurcated extension 146 of the tubular bracket portion 137, one arm of which lever is connected to the rod 136 of the cutter carrier by a link 147. The other arm of the lever 145 is connected with shaft Sa by a rod 148 having a bifurcated member 149 adjustably mounted on one end and pivotally connected to said lever arm. A yoke member 150 is adjustably mounted on the opposite end of the rod 148 to straddle the shaft and carries a roller 151 engaging a cam groove in a disk 152 fixed on the shaft.

After the closure disk is engaged in the receptacle body carried by the holder 94 the holder carrier disk 95 is actuated to present the disk carrying end of the receptacle to spinning or heading mechanism whereby the disk flange and receptacle body are interfolded to secure the closure disk in the receptacle body, when the holder carrier disk is actuated to position the receptacle holder relative to means to eject the formed receptacle from said holder to suitable depository means, but as said heading and ejecting means do not constitute a part of the invention of this application illustration and description of the same is not deemed necessary.

It will be obvious that various modifications may be made in construction and arrangement of parts, and that portions of the invention may be used without others, and come within the scope of the invention.

Having thus described my invention, I claim:

1. In receptacle forming apparatus, a mandrel, a plunger reciprocatory in a direction toward and away from the mandrel to clamp a receptacle blank intermediate the sides thereof to the mandrel, a pair of flaps shaped to conform to the contour of the mandrel arranged at opposite sides of the plunger and longitudinal axis of the mandrel and having reciprocatory movement in a direction toward and away from the mandrel in parallel relation to and simultaneously with the clamping plunger and movement in a direction toward each other, means to yieldingly urge said flaps in a direction toward each other to wrap the opposite marginal portions of the blank about the mandrel under tension as said flaps are uniformly moved toward the mandrel, and means movably carried by one of the flaps and yieldingly positioned in advance thereof to engage and direct the adjacent marginal portion of the blank below the other marginal portion of the blank during the forward movement of the flaps in wrapping the blank about the mandrel, a ram to engage with the marginal portions of the blank wrapped around the mandrel by the flaps and adapted to move said means to direct a marginal portion of the blank under the other marginal portion of the blank out of the path of movement of the face of the ram.

2. In a receptacle body forming apparatus, a mandrel, a plunger reciprocatory toward and away from the mandrel to clamp a receptacle blank intermediate the side edges thereof to the mandrel, a pair of flaps of arcuate shape in cross section to conform to the contour of the mandrel normally positioned below and simultaneously reciprocatory with the plunger relative to the opposite sides of the mandrel and toward and away from each other, means to yieldingly urge said flaps in a direction toward each other to wrap the opposite marginal portions of the blank above the mandrel under tension during the movement of the flaps in one direction relative to the mandrel, a plate of arcuate shape in cross section extending longitudinally of and adjustably carried upon one of said flaps to have movement in an arc to intersect the arc and movement of the flap to engage and direct one marginal portion of the blank below the other marginal portion of the blank during the final movement of the flaps in wrapping the blank around the mandrel to overlap the free marginal portions of the blank, and means to press the overlapped marginal portions of the blank on the mandrel, and the plate having means extending laterally therefrom adapted to be engaged by said pressing means and moved out of the path of movement of said pressing means as it moves to the mandrel.

3. Receptacle body forming apparatus as claimed in claim 2, wherein the plate carrying flap is arranged with blocks the upper surfaces of which are of arcuate form extending in an arc intersecting the arc of the flap, and the plate is slidably mounted on the blocks to have movement relative to and guided by the arcuate surfaces thereof.

4. In receptacle forming apparatus, a mandrel, a plunger reciprocatory in a direction toward and away from the mandrel to clamp a receptacle blank intermediate the sides thereof to the mandrel, a pair of flaps arranged at opposite sides of the plunger and longitudinal axis of the mandrel and having uniform reciprocatory movement in a direction toward and away from the mandrel in parallel relation to and simultaneously with the clamping plunger and movement in a direction toward each other, means to yieldingly urge said flaps in a direction toward each other to wrap the portions of the blank at opposite sides of the plunger about the mandrel under tension, a plate of arcuate shape in cross section adjustably carried by one of said flaps to have movement forwardly and rearwardly of the forward edge of the flap and normally yieldingly urged to position forward of said flap to direct one marginal portion of the blank below the other marginal portion of the blank during the final movement of the flaps to wrap the blank about the mandrel to overlap the free marginal portions of the blank on the mandrel, means movable toward and away from the mandrel for pressing the overlapping edges of the blank on the mandrel, and means adjustably mounted on the pressing means to engage and move the plate carried by the one flap rearwardly of the forward edge of the flap and out of the path of movement of said pressing means to the mandrel.

5. In receptacle body forming apparatus, a cylindrical mandrel, a ram movable into and out of engagement with the mandrel, a shelf to support a receptacle blank below the mandrel, a pair of flaps of arcuate shape in cross section to conform to the shape of the mandrel, said flaps being normally positioned below the shelf and movable through openings in the shelf toward and away from the mandrel and operative to lift a blank from the shelf and wrap it around the mandrel, a plate of arcuate shape in cross section movably carried by and extending longitudinally of one of the flaps and normally urged to position beyond the forward edge of the flap and operative to direct one longitudinal marginal portion of the blank as it is wrapped around the mandrel by the flaps below the other marginal portion of the blank and said plate having laterally extended means adapted to be engaged by the ram to move the plate out of engagement with the blank and rearwardly of the forward edge of the flap out of the path of movement of the ram toward the mandrel.

6. In receptacle body forming apparatus as claimed in claim 5, wherein the laterally extended means of the plate are in the form of cam abutments, and abutments adjustably mounted on the ram to engage the cam abutments of the plate and move the plate out of the path of movement of the ram during the movement of the ram toward the mandrel.

7. In receptacle body forming apparatus, a mandrel, a support below the mandrel for a receptacle blank, a plunger having the opposite edges converging toward the end reciprocatory toward and away from the mandrel to releasably clamp a blank intermediate the side edges to the mandrel, a head through which the clamping plunger is slidably extended adapted to have movement in a direction toward and away from the mandrel and longitudinally of the plunger, arms pivotally carried by and extending upward from the head in opposed relation to and have movement toward and away from the opposite edges of the clamping plunger, rollers carried by said arms, a spring to urge the arms toward each other and the rollers into engagement with the opposite edges of the clamping plunger, flaps pivotally carried at the upper ends of said arms shaped to conform to the outer contour of the mandrel, said flaps during the initial movement thereof with the head toward the mandrel being adapted to move simultaneously with the clamping plunger and the rollers carried by the flap carrying arms engaging the opposite edges of the plunger and maintaining the flaps in predetermined spaced relation and operative with the plunger to lift a blank from the support and move it to the mandrel and said rollers as the blank is clamped to the mandrel riding off of the plunger relative to the converging edge portion and the flaps urged into engagement with the mandrel during the blank wrapping movement of the flaps, and means carried by one of the flaps to engage the marginal portion of the blank in advance of the flap and direct said marginal portion of the blank below the other mandrel portion of the blank during the final movement of the flaps in wrapping the blank about the mandrel.

GEORGE LUTZ.